Patented Feb. 17, 1953

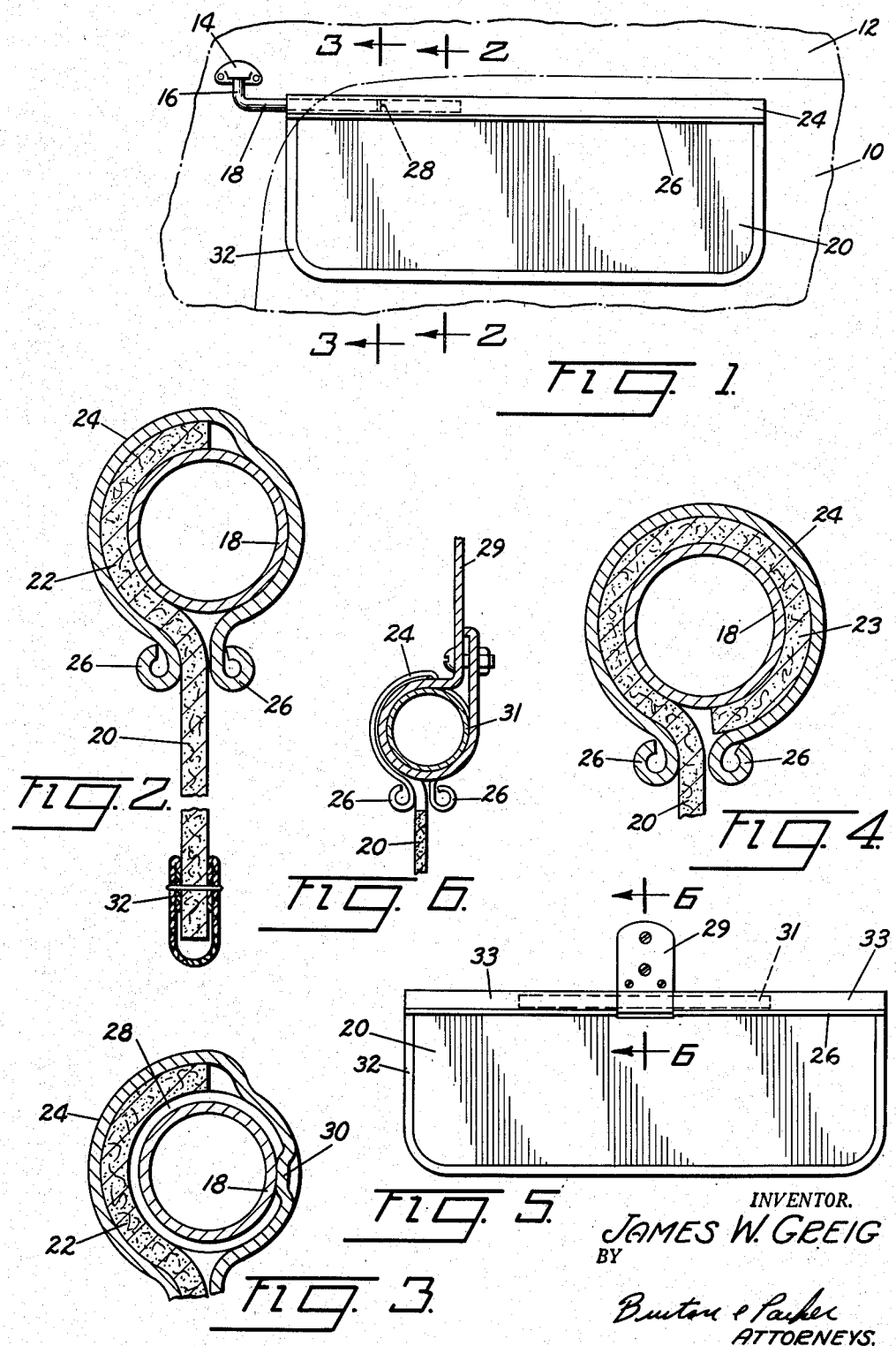

2,628,861

UNITED STATES PATENT OFFICE 2,628,861

SUN VISOR

James W. Greig, Detroit, Mich., assignor to Woodall Industries Inc., Detroit, Mich., a corporation of Michigan Application September 29, 1947, Serial No. 776,847

1 Claim. (Cl. 296—97)

This invention relates to improvements in sun visors and particularly to visors of the type used in the interior of vehicle bodies to shield the eyes of an occupant from the rays of the sun.

One object is to provide such a visor which is fabricated from a minimum number of parts, which is of simple construction, which may be easily and quickly assembled, which is easily operable, which is effective for the purpose for which it is intended, and which is inexpensive.

Another object is to provide such a visor which is of lightweight construction and because of its light weight it can be supported within an automobile body upon a simple, inexpensive, lightweight bracket support, and which visor is adapted for use with different bracket supports.

A further object is to provide a visor of the character described which presents a neat, attractive and modern appearance.

Other objects, advantages and meritorious features will more fully appear from the following specifications, claim and accompanying drawing, wherein:

Fig. 1 is a fragmentary elevation of a portion of the interior of an automobile showing an embodiment of my improved visor mounted therein.

Fig. 2 is a vertical sectional view taken on the line of 2—2 of Fig. 1.

Fig. 3 is a vertical sectional view taken on the line 3—3 of Fig. 1.

Fig. 4 is a vertical sectional view through a modified embodiment of my improved visor taken on the same line as the view in Fig. 2.

Fig. 5 is a side elevation of a modified form of a visor mounting as compared with that shown in Fig. 1.

Fig. 6 is a vertical sectional view taken on the line 6—6 of Fig. 5.

In the drawing a fragment of the windshield of an automobile body is indicated by the numeral 10 and the header is indicated by the numeral 12. A typical visor supporting bracket is identified as 14. This bracket provides the mounting for an angular visor supporting rod 18 upon which a visor blade 20 is journaled. This rod has a short end portion 16 which is journaled within the bracket to support the visor to swing either before the side window or before the windshield of a vehicle body. In the construction here shown this rod is in the form of a hollow tube as appears in Figs. 2, 3, 4 and 6 of the drawing. The rod, however, may be in the form of a solid rod as is conventional in the industry.

My improved visor assembly includes a visor blade 20 which may be formed of suitable composition material such as a plastic composition sheet. Celluloid, Bakelite, or any other suitable plastic might be employed. One linear margin of the blade is shaped to exhibit a seat for the blade upon the rod. As illustrated herein the marginal portion of the blade is bent upon itself to define an offset tubular seat 22 for the supporting rod portion 18. In Fig. 2 this tubular seat is shown as being in the form of a semi-cylindrical channel. In Fig. 4 this tubular seat is bent to form a substantially complete cylindrical tube. Either form may be employed. The form shown in Fig. 2 facilitates assembly. The form shown in Fig. 4 presents a uniform appearance and relatively uniform friction about the rod.

The material of which the visor blade is fabricated is preferably of a flexible character so that the tubular seat portion 22 or the sleeve 23 may be readily contracted or flexed to be gripped about the rodlike support 18. To grippingly hold the tubular seat portion of the blade about the rodlike support 18 I provide a split resilient sleeve 24 which may be formed of steel or the like. This sleeve is of a diameter such that when placed about the tubular seat margin of the blade and about the rodlike support 18 the tubular seat of the blade is held gripped frictionally against the rod so as to releasably maintain its position of rotation thereabout. The sleeve 24 may be formed to exhibit any desired degree of resiliency to hold the blade seat against the support rod with the desired friction.

The opposed margins of the sleeve may be rolled over as at 26 forming finish beads as shown in Figs. 2 and 4. These rolled over edges are preferably disposed spaced slightly from the opposite surfaces of the blade 20 whereby the tube always exerts a contracting pressure upon the tubular seat holding such seat of the blade against the tube 18.

In Fig. 2 the two longitudinal halves of the sleeve are formed on radii of different length so that one half bears directly against the seat portion 22 of the blade and the other half bears directly against the tubular support 18. In Fig. 4 the split sleeve contracts the tubular portion 23 of the blade about the support 18 substantially throughout the circumference of the tube 23.

In Fig. 3 there is shown simple means for securing the visor blade upon the support against longitudinal displacement thereover. The tubular support 18 is deformed to provide an encircling channel 28. Such channel may be spun in the wall of tube 18. The sleeve 24 has a detent 30 formed therein which detent is seated within the channel 28. This engagement holds the sleeve upon the rod against endwise displacement. The margin of the blade may be provided with a binding 32 if desired or the blade 20 itself might be formed with a decorative marginal trim or bead.

It will be noted that in Fig. 1 the portion 18 of the tubular support is shown as extending only part way along the margin of the blade. The amount of frictional engagement may be varied by providing rods of different lengths. The split resilient tube 24 is shown in Fig. 1 as extending along the length of the visor blade. It forms a stiffener and support for the blade as well as serving to hold the seat portion of the blade against the supporting rod. Such sleeve also provides a finish edge for the hinge margin of the blade.

In Figs. 5 and 6 is shown a modification wherein a bracket 29 is provided with a rod like support 31 having opposed ends extending in opposite directions from the bracket 29. Split resilient sleeves 33 are received over the two ends of the rod 31 holding the semi-tubular seat portions of the blade thereagainst as shown and as hereinabove described.

The construction is very simple. Only three parts are shown in Fig. 1, the tubular support 18, the blade 20 and the split contractile sleeve 24. It is obvious that this construction may be of exceedingly light weight. Plastic sheet material which may be used to form the blade is available in materials which exhibit good wear resistance and frictionally engage the supporting tube so as to readily maintain the visor at adjusted positions. The light weight of the blade facilitates its maintenance at adjusted positions of rotation with relatively light pressure thereupon. It also permits the use of a split resilient tube 24 of light weight construction. The lightweight character of the entire assembly further makes it possible to employ a simple lightweight bracket to support the same.

What I claim is:

In a sun visor, a rod-like support, a visor blade having one margin shaped to provide a laterally offset tubular seat so formed as to conform to the support and received about the support and a split resilient sleeve removably received about said tubular seat portion of the blade and about the support grippingly holding said seat portion of the blade frictionally against the support to maintain the blade at adjusted positions of rotation about the support, the opposite edge portions of the sleeve at the split projecting outwardly in substantially spaced parallelism over opposite sides of the blade away from the support and to a point spaced beyond the line of juncture of the offset seat portion of the blade with the remainder of the blade whereby the margins of the split tube are adapted upon rotation of the blade about the support to form oppositely disposed lines of contact with the blade spaced outwardly beyond the line of juncture of the seat with the blade, said opposed spaced substantially parallel edge portions of the tube being normally spaced apart a distance slightly greater than the thickness of that portion of the blade received therebetween.

JAMES W. GREIG.

REFERENCES CITED

The following references are of record in the file of this patent:

UNITED STATES PATENTS

| Number | Name | Date |
| --- | --- | --- |
| 57,263 | Winter | Aug. 14, 1866 |
| 1,180,589 | Kubat | Apr. 25, 1916 |
| 1,390,384 | Ramsaur | Sept. 13, 1921 |
| 1,862,432 | Rose | June 7, 1932 |
| 2,185,898 | Mitchell | Jan. 2, 1940 |

FOREIGN PATENTS

| Number | Country | Date |
| --- | --- | --- |
| 342,538 | Great Britain | Feb. 5, 1931 |